(12) United States Patent
Johnson

(10) Patent No.: US 6,374,553 B1
(45) Date of Patent: Apr. 23, 2002

(54) CONCRETE STEP SHELTER

(76) Inventor: Richard Vail Johnson, P.O. Box 3, Milford, DE (US) 19963

( * ) Notice: Subject to any disclaimer, the term of this patent is extended or adjusted under 35 U.S.C. 154(b) by 0 days.

(21) Appl. No.: 09/244,308

(22) Filed: Feb. 4, 1999

(51) Int. Cl.[7] .............................. E04B 1/98; E04H 9/02
(52) U.S. Cl. ........................ 52/169.6; 52/107; 52/186
(58) Field of Search .............................. 52/20, 21, 107, 52/79.1, 79.4, 79.11, 169.6, 182, 184, 186, 189, 190

(56) References Cited

U.S. PATENT DOCUMENTS

| | | |
|---|---|---|
| 2,652,614 A | 9/1953 | Como |
| 3,126,605 A | 3/1964 | Davis |
| 3,727,707 A | 4/1973 | Machala |
| 4,126,972 A | 11/1978 | Silen |
| 4,226,062 A * | 10/1980 | Doane .................. 52/169.6 |
| 4,539,780 A | 9/1985 | Rice |
| 4,615,158 A | 10/1986 | Thornton |
| 5,481,837 A | 1/1996 | Minks, Jr. |

* cited by examiner

*Primary Examiner*—Carl D. Friedman
*Assistant Examiner*—Yvonne M. Horton
(74) *Attorney, Agent, or Firm*—John C. Andrade, Esquire

(57) ABSTRACT

An economical step shelter is disclosed for use with mobile homes, modular homes, or other homes not incorporating basements. The step shelter is manufactured by modifying the existing molds for making steps and adding an opening large enough for a human being to enter and exit and a means for closing said opening, typically a steel door. The step shelter is economical and efficient and practical for use with existing or new homes.

12 Claims, 4 Drawing Sheets

CONCRETE STEP SHELTER

BACKGROUND

This invention relates to a pre-cast concrete step shelter that is relatively inexpensive and can be efficiently used with existing homes or new home construction. There are many storm shelters on the market that offer protection from storms or tornadoes and which can include basements involving excavations or expensive structures requiring building permits and extensive materials and expensive construction costs. There are homes that are located in areas where excavations are not possible and there are other homes where, for economic reasons, excavations are not practicable. The danger to individuals living in a home without some type of excavated structure nearby can be high, especially in those areas where tornadoes and high wind storms are common place. The need exists, therefore, for a low cost storm shelter that will provide temporary shelter in the event of a tornado or high wind storm.

U.S. Pat. No. 5,481,837 provides a storm shelter for use with a mobile home. It requires an excavation and the construction of a structure that is set into the excavation. In addition, it may not be feasible with existing mobile homes without the necessity and expense of moving the mobile home before constructing the excavation and the structure.

One object of the present invention is to provide a low cost, efficient concrete shelter that can be easily added to existing mobile homes, modular homes, or other homes without basements and be easily incorporated into new homes. Another object of the invention is to provide a shelter that is simple in design and economical to construct and is easily accessible.

SUMMARY OF THE INVENTION

The pre-cast concrete step shelter includes a plurality of steps, sidewalls, and top and back walls enclosing an area large enough to fit at least one adult or at least 10 ft$^3$. One of the side walls includes an opening having a height of at least 16" preferably at least 20" and a width of at least 16" preferably at least 20". The depth of the opening would be the same depth of the side wall and there would be a means for closing the opening. The means for closing the opening would preferably be comprised of a steel door that would be hinged to the side wall adjacent to the opening in such a way that the door could be rotated around the hinge for entry and exit from outside the shelter. It is important that the door include a latching means wherein the latching means is attached to the door so that it can be latched from the inside and from the outside. As a safety feature, no locking means would be provided, thus preventing someone from being locked into the storm shelter from the inside or the outside. The shelter should be constructed so that it could be anchored into the ground and the means for anchoring would include a step anchor connection preferably eye bolts rigidly attached to the steps and an attachment means such as a cable, metal strap, or a chain suitable for attachment to an anchor-stake for anchoring the shelter.

The structure is formed by utilizing a standard mold for casting a monolithic concrete stair structure having an plurality of steps, sidewalls, and top and bottom walls. The mold further comprises inner and outer forms having side members for forming said sidewalls and center members for forming said steps and top and back walls of the structure. The molds should further include the spacing member having a height of at least 16" and a width of at least 16". The spacing member would be attached between the inner and outer forms to the side members on one side of the forms so that an opening would be formed on one side of the step shelter structure.

A further safety feature of the pre-cast invention is to add the name of the company "LIFE SHIELD" in reflective paint to the rear of the step shelter. The reflective paint is added to the rear of the shelter so that it would not be subjected to wear from weather but would be exposed in the event that the home was destroyed. The reflective paint would be exposed, alerting authorities searching for survivors at night.

BRIEF DESCRIPTION OF THE DRAWINGS

The invention is further described in connection with the accompanied drawings in which.

DETAILED DESCRIPTION OF THE INVENTION

Figure 1:
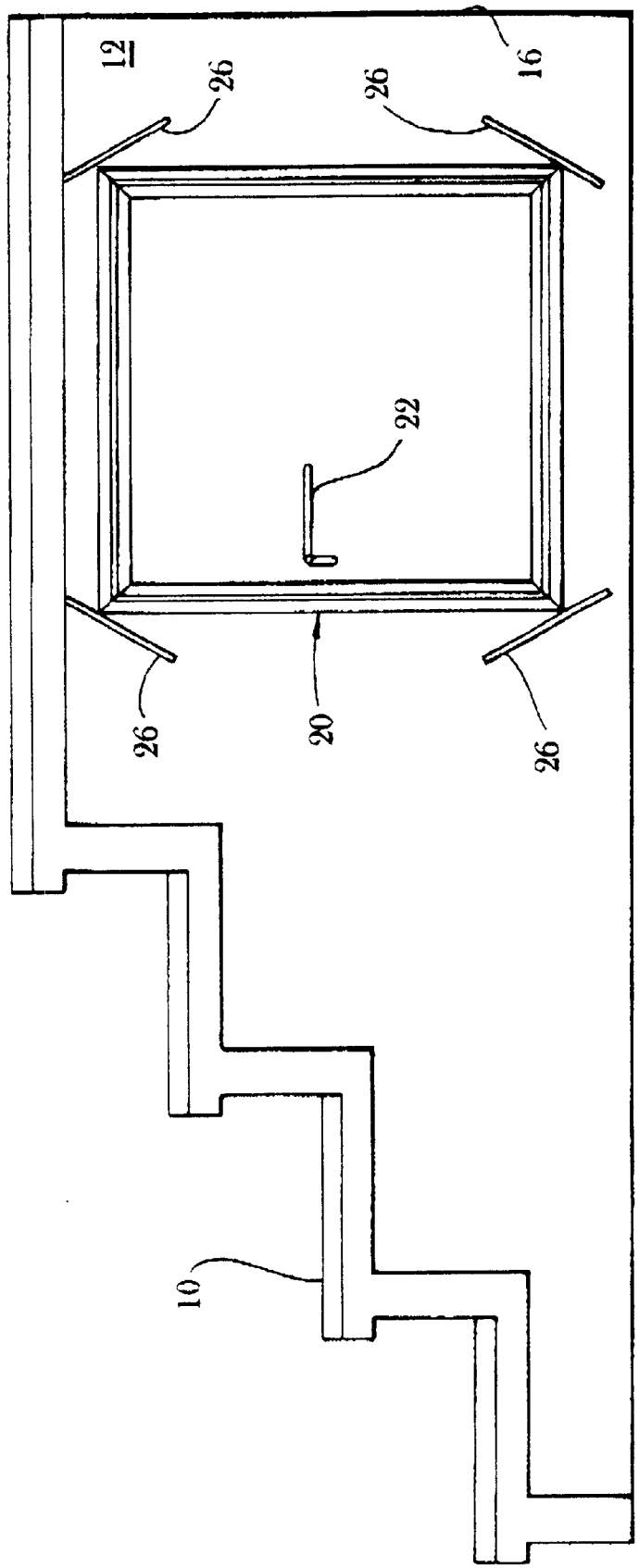
FIG. 1 is a right side view of the concrete step shelter of the present invention showing the opening and door for said shelter.
Figure 5:
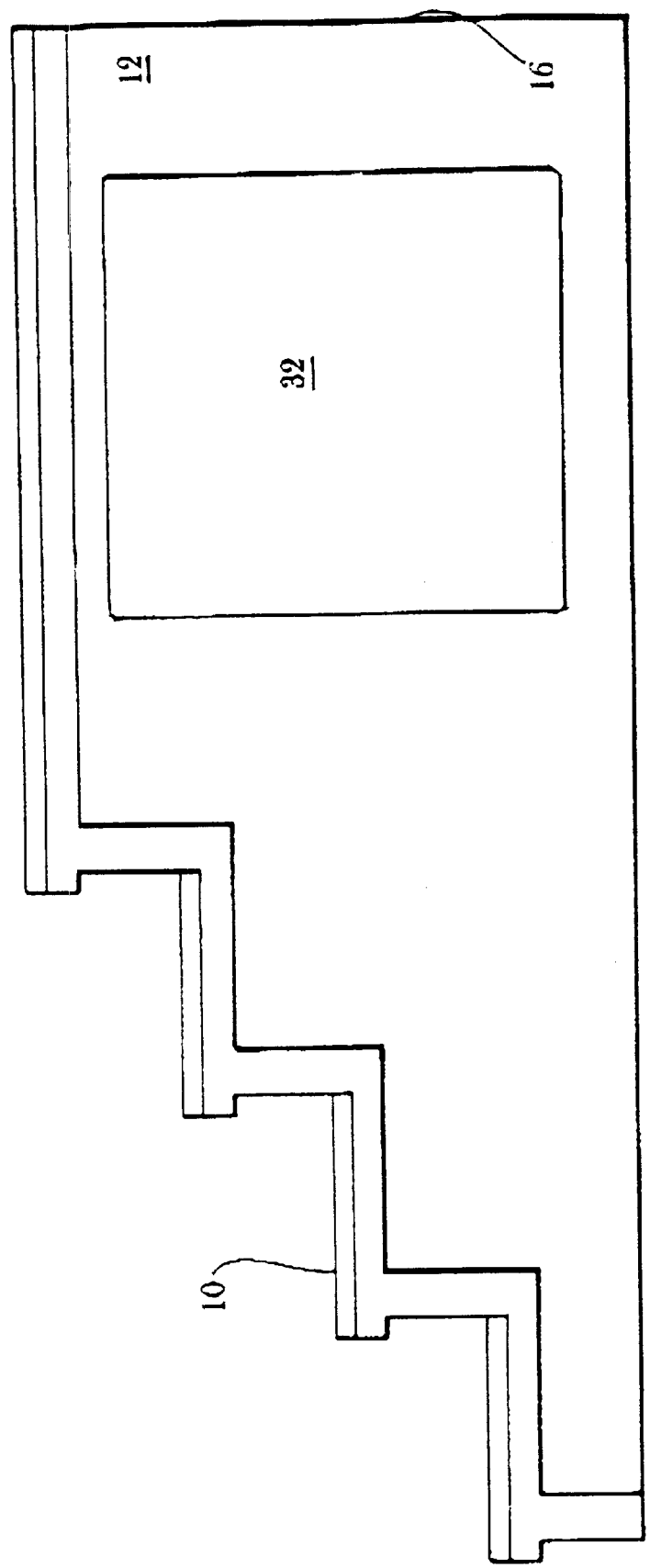
FIG. 5 is the right side view of FIG. 1 showing the opening in the side wall.

A right side view of the concrete step shelter is shown in FIG. 1. The door 20 shown on the right side of the structure can be on either side, but should only be on one side of the structure. The opening 32 as shown in FIG. 5 should be at least 16" preferably at least 20" in height and 16" preferably at least 20" in width in order to enable an adult to enter into the step shelter. The door latch 22 as shown in FIG. 1 must be of a type that can be opened from both the inside and the outside. It is important that the latch not be lockable from the inside or the outside in order to prevent someone from being inadvertently locked inside the shelter.

Figure 2:
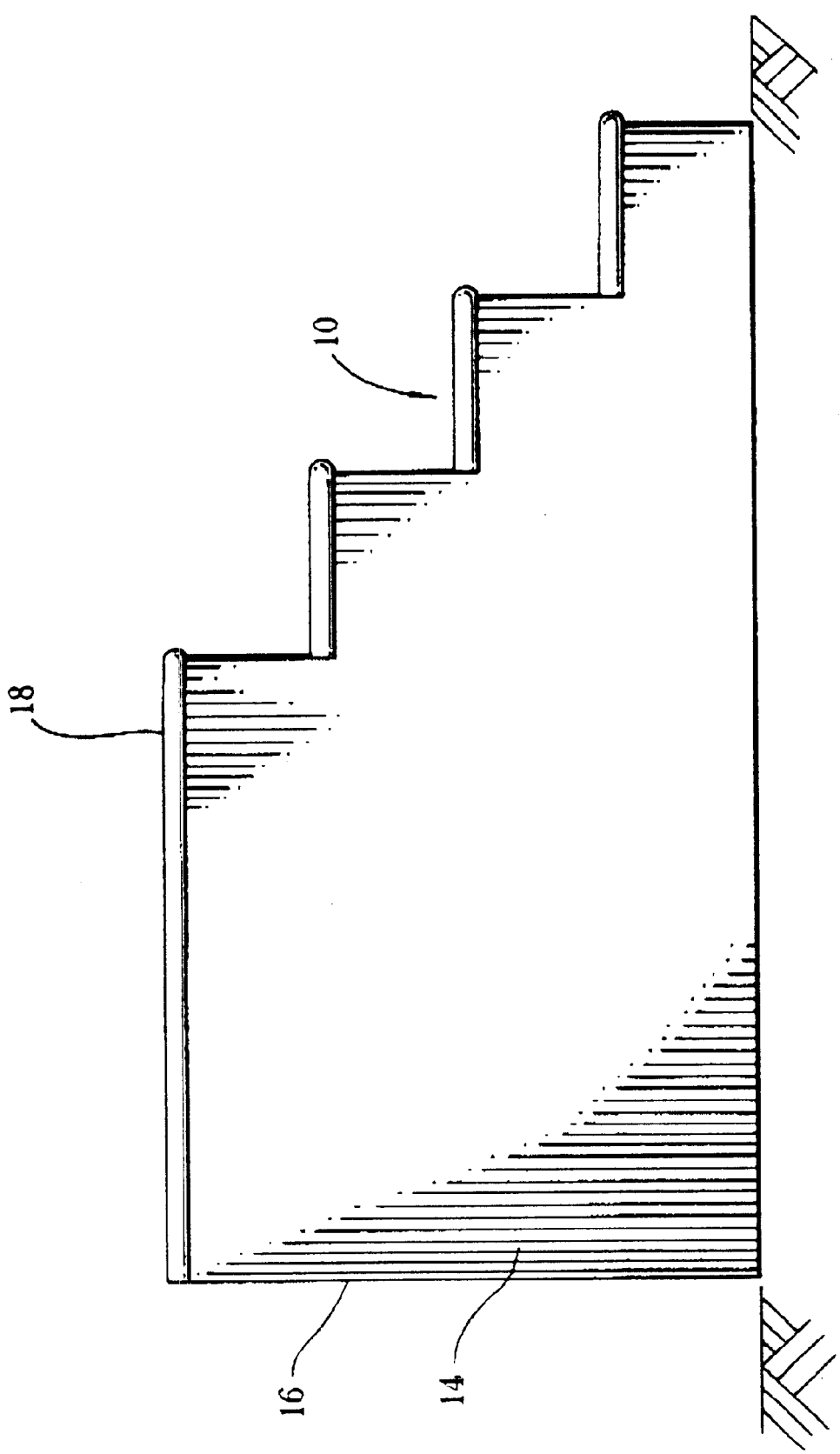
FIG. 2 is a left side view of the concrete step shelter showing the left side opposite the side having the opening.

The structure itself is comprised of the right side wall 12 as shown in FIG. 1 and the left side wall 14 as shown in FIG. 2, the steps 10 and rear wall 16 as shown in FIG. 1 and 2 and the top 18. Steel rods 26 can be included as shown in FIG. 1 to reinforce the strength of the structure around the door 20.

The present invention also includes a method for making a pre-cast concrete step shelter by converting a standard mold for pre-casting monolithic concrete stair structure into a mold suitable for making the step shelter of the present invention. The opening 32 as shown in FIG. 5 can be created by utilizing a space in the mold so that the steps are pre-cast with the opening 32 included therein.

Figure 3:
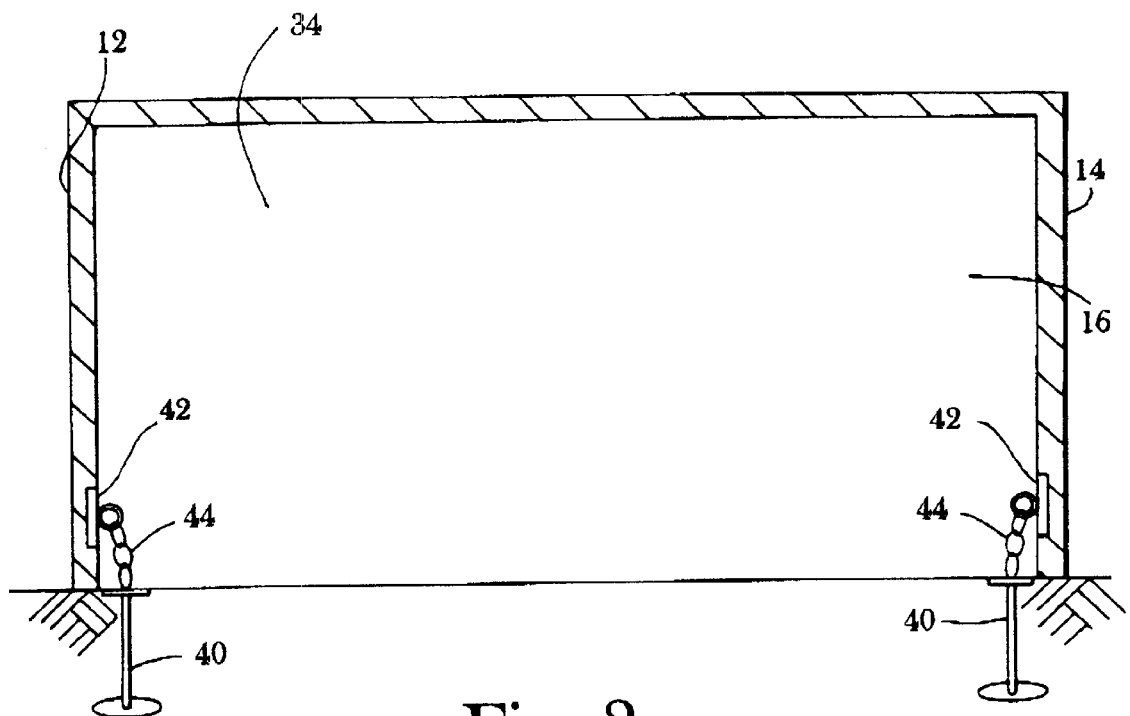
FIG. 3 is a rear view of the step shelter.

FIG. 3 is a rear view of the step shelter and shows the means for anchoring the step shelter to the ground. Typically, there would be four points to which the shelter is fastened to the ground. The step anchor connection shown in FIG. 3 are eye bolts 42 on both the right side 12 and the left side 14. The eye bolts are connected to cable 44 which is attached to anchor stakes 40 that are anchored into the ground, thus securing the step shelter to the ground in case of a storm. The name of the Company "LIFE SHIELD" would be painted in the upper middle of the back wall 34 in reflective paint on the exterior of the back wall 16 enabling the back of the step shelter to be more easily seen in the event the structure it is attached or adjacent to is ripped away or destroyed in a storm.

Figure 4:
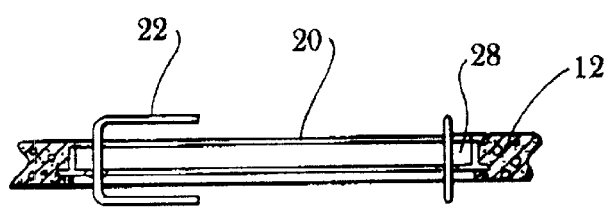
FIG. 4 is a perspective view showing the latching means for the door.

FIG. 4 shows the latch 22 for the door of the step shelter. The latch is suitable for opening the door 20 from the inside and the outside of the step shelter as is shown in FIG. 4. The door is attached to the right side wall 12 by the hinge 28.

I claim:

1. A pre-cast concrete step shelter comprising a plurality of steps having a first and second side wall and top and back walls enclosing a usable area thereunder of at least 10 ft$^3$, wherein said first side wall includes an opening for human ingress and egress from said enclosed area having a height of at least 16", and a width of at least 16" and a depth the entire depth of said first side wall and a means for closing said opening within said first side wall.

2. The shelter of claim 1 wherein said closing means is a door and further comprising a hinge means attached to said first side wall adjacent to said opening and suitable for rotably attaching said door to said hinge means.

3. The shelter of claim 2 wherein said door is comprised of steel.

4. The shelter of claim 2 further comprises a latching means suitable for latching said door to said side wall.

5. The shelter of claim 1 further comprises means for anchoring said shelter.

6. The shelter of claim 5, wherein said anchor means includes anchor-stakes anchored into the ground, eye bolts rigidly attached to said shelter and an attachment means suitable for connecting said eye bolts to said anchor-stakes for anchoring said shelter.

7. The shelter of claim 2 wherein said opening has a height of at least 20", and a width of at least 20" and wherein said enclosed area is at least 20 ft$^3$.

8. The shelter of claim 7 further comprising reflective paint on the exterior of said back wall.

9. A method for making a pre-cast concrete step shelter comprising adding to a standard mold for pre-casting a monolithic concrete stair structure, including a plurality of steps having, a first and second side wall and top and back walls enclosing a usable area thereunder of at least 10 ft$^3$, a means for making an opening in said first side wall having a height of at least 16" and a width of at least 16".

10. The method of claim 9 wherein said enclosed area is at least 20 ft$^3$ and the height and width of said opening are at least 20" each.

11. The method of claim 10 further comprising attaching a steel door to said first side wall for closing said opening.

12. The method of claim 11 further comprising anchoring said shelter.

* * * * *